United States Patent
Lee (10) Patent No.: US 6,735,674 B2
(45) Date of Patent: May 11, 2004

(54) METHOD OF MAINTAINING DATA COHERENCY IN LATE-SELECT SYNCHRONOUS PIPELINE TYPE SEMICONDUCTOR MEMORY DEVICE AND DATA COHERENCY MAINTAINING CIRCUIT THEREFOR

(75) Inventor: Kwang-Jin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 496 days.

(21) Appl. No.: 09/886,308

(22) Filed: Jun. 21, 2001

(65) Prior Publication Data

US 2002/0087805 A1 Jul. 4, 2002

(30) Foreign Application Priority Data

Dec. 28, 2000 (KR) ........................................ 2000-83610

(51) Int. Cl.⁷ .............................................. G06F 12/00
(52) U.S. Cl. ...................... 711/140; 711/104; 711/141
(58) Field of Search ................................. 711/104, 140, 711/141

(56) References Cited

U.S. PATENT DOCUMENTS 5,895,487 A * 4/1999 Boyd et al. .................. 711/122
6,320,794 B1 * 11/2001 Kang et al. ............. 365/189.02
6,385,710 B1 * 5/2002 Goldman et al. ............ 711/169
6,484,246 B2 * 11/2002 Tsuchida et al. ............. 711/169

FOREIGN PATENT DOCUMENTS

EP     000636987 A2 *  6/1994  ........... G06F/12/08

* cited by examiner

Primary Examiner—Mano Padmanabhan
Assistant Examiner—Paul A Baker
(74) Attorney, Agent, or Firm—F. Chau & Associates, LLC (57) ABSTRACT

A method and device for maintaining data coherency in a semiconductor memory device, having two or more memory chips combined into one chip and operated according to a late select synchronous pipeline type input/output protocol. A method includes the steps of generating first and second bypass summation signals by utilizing a chip block select address signal inputted in a latest write operation and comparison signals obtained from comparison between a latest write address and a current read address; and generating first and second bypass control signals having logic values contrary to each other by utilizing the first and second bypass summation signals and an internal clock signal, wherein a bypass operation is performed in one of read paths associated with the memory chips and a normal read operation is performed through other read paths when all the comparison signals are same.

17 Claims, 6 Drawing Sheets

METHOD OF MAINTAINING DATA COHERENCY IN LATE-SELECT SYNCHRONOUS PIPELINE TYPE SEMICONDUCTOR MEMORY DEVICE AND DATA COHERENCY MAINTAINING CIRCUIT THEREFOR

BACKGROUND OF THE INVENTION

1. Field of the Invention

The present invention relates to a semiconductor memory device; more particularly, to a system and method for maintaining data coherency in synchronous pipeline type semiconductor memory devices.

2. Description of the Related Art

Synchronous pipeline type semiconductor memory devices generally use a common input output (IO) mode in which input/output signal busses are shared to reduce package complexity, cost of chip, and ease of system mount on board, etc. However, such a common IO mode may cause a data contention problem between output data being outputted from memory cells and input data that are recorded in memory cells in a back-to-back operation such as a write-to-read operation or a read-to-write operation.

Therefore, to prevent the data contention problem, a dead cycle, that is, a no-operation period (NOP) should be added while a read operation is changed to a write operation. For this reason, many synchronous pipeline type semiconductor memory devices tend to employ the late write mode during write operations in which input data is input about 1 cycle to 2 cycles later than input addresses, thereby minimizing the number of NOP cycles.

Conventional synchronous type semiconductor memory devices for high-speed operation are disclosed, for example, in U.S. Pat. No. 5,717,653 to Suzuki, issued on Feb. 10, 1998, "Late-write type SRAM in which address decoding time for reading data differs from address-decoding time for writing data." Suzuki describes a late-write type SRAM wherein the total time required to write data can be reduced.

The late-write type memory device in a late write operation delays write addresses inputted from the outside for several cycles to input the write address to an address decoder and select word lines and bit lines. A data input signal inputted from the outside after being delayed by several cycles from write address input is transmitted to a write driver, thereby a write operation starts after several cycles. That is, the write operation after 2 cycles in a late-write type memory device means that data to be written is input 2 cycles after a write address is input.

In such a late write method, when a write operation is changed into a read operation, data inputted in a final write operation are not written in a predetermined memory cell in a cell array, but stored in an input register only. Accordingly, if a read operation for an address corresponding to the final write operation is performed, the semiconductor memory device directly transmits data in an input register, not in a memory cell, to an output driver. This is called a bypass operation.

Recent semiconductor memory devices employ the bypass operation to maintain data coherency other than the late write mode. That is, in such semiconductor memory devices, when write order is input several cycles before read order is input and a write address is the same as a read address, a prior write data is output through an output buffer without a normal read operation from a memory cell.

Figure 1:
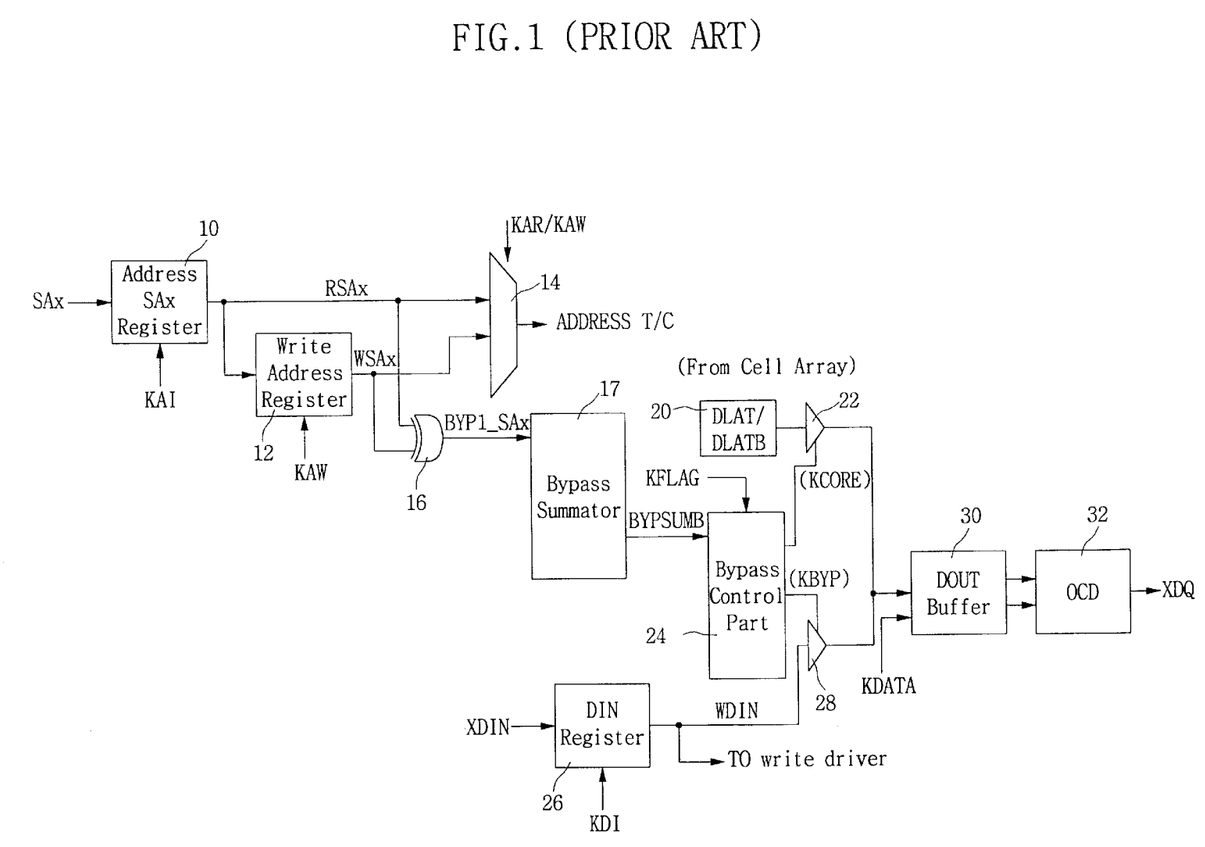
FIG. 1 is a block diagram showing a conventional data coherency maintaining circuit for a synchronous type semiconductor memory device.

FIG. 1 shows a conventional circuit block performing a bypass operation to maintain data coherency in a synchronous type semiconductor memory device. Where the address SAx register 10 samples and stores an external address SAx every cycle according to the internal clock signal KAI. The stored external address SAx is output as an input address RSAx. The input address RSAx is output as a read address signal ADDRESS T through the multiplexer 14 responding to the internal clock KAR in a read operation, and stored in the write address register 12 responding to the internal clock KAW in a write operation. The input address stored in the write address register 12 is output as a write address WSAx, and output as a write address signal ADDRESS C through the multiplexer 14 responding to the internal clock KAW in a next write operation. The read address signal ADDRESS T and write address signal ADDRESS C are input to column and row address decoders (not shown).

A comparator 16 compares the input address RSAx with the write address WSAx to determine whether the write address is the same as the input address. Here, the input address RSAx is a read address in a late write mode. Bypass comparison signals BYP1_SAx being outputted from the comparator 16 is input to a bypass summator 17. The bypass summator 17 sums the bypass comparison signals BYP1_SAx to output a summation signal BYPSUMB to a bypass control part 24. The bypass control part 24 receives and logically gates the bypass summation signal BYPSUMB and the internal clock signal KFLAG to output a bypass control signal KBYP and a core control signal KCORE. When the bypass control signal KBYP is enabled, the core control signal KCORE is disabled, thereby stopping an operation in a first transmission part 22. Accordingly, the output data of a sense amplifier amplifying data in a memory cell in a memory array cannot be transferred to a data output buffer 30. On the other hand, when a second transmission part 28 is operated, the write data WDIN that has not been stored in the memory cell but stored in a data input register 26 is input to the data output buffer 30. That is, the bypass operation is performed. The data output buffer 30 outputs the write data WDIN to the off-chip driver OCD 32 in response to the buffer control signal KDATA. The off chip driver 32 drives and finally outputs the buffered write data WDIN as an external output data XDQ.

Figure 2:
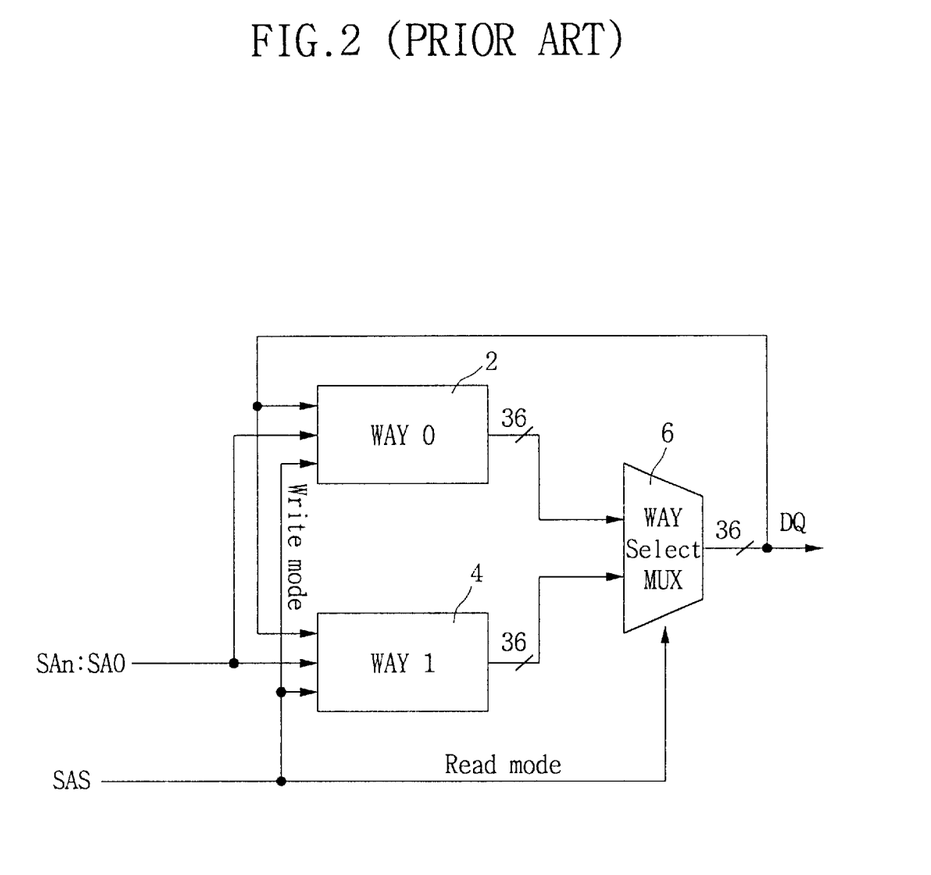
FIG. 2 is a block diagram showing an operation scheme of a late select synchronous pipeline type memory device.

However, it is difficult to apply the data coherency maintaining circuit in FIG. 1 to late selection synchronous pipeline type semiconductor memory devices in which two or more memory banks or chips are incorporated into a single chip. The late selection synchronous pipeline memory has, for example as shown in FIG. 2, two cache memory chips 2, 4 combined in one chip and a multiplexer 6 for selecting one of the outputs of the cache memory chips 2, 4 in response to the selection signal SAS. It is difficult to realize a bypass operation by applying the data coherency maintaining circuit shown in FIG. 1 to the late selection synchronous pipeline type memory device in FIG. 2. The reason is that the conventional data coherency maintaining circuit in FIG. 1 is designed to perform the bypass operation for a single bank or memory chip.

Figure 3:
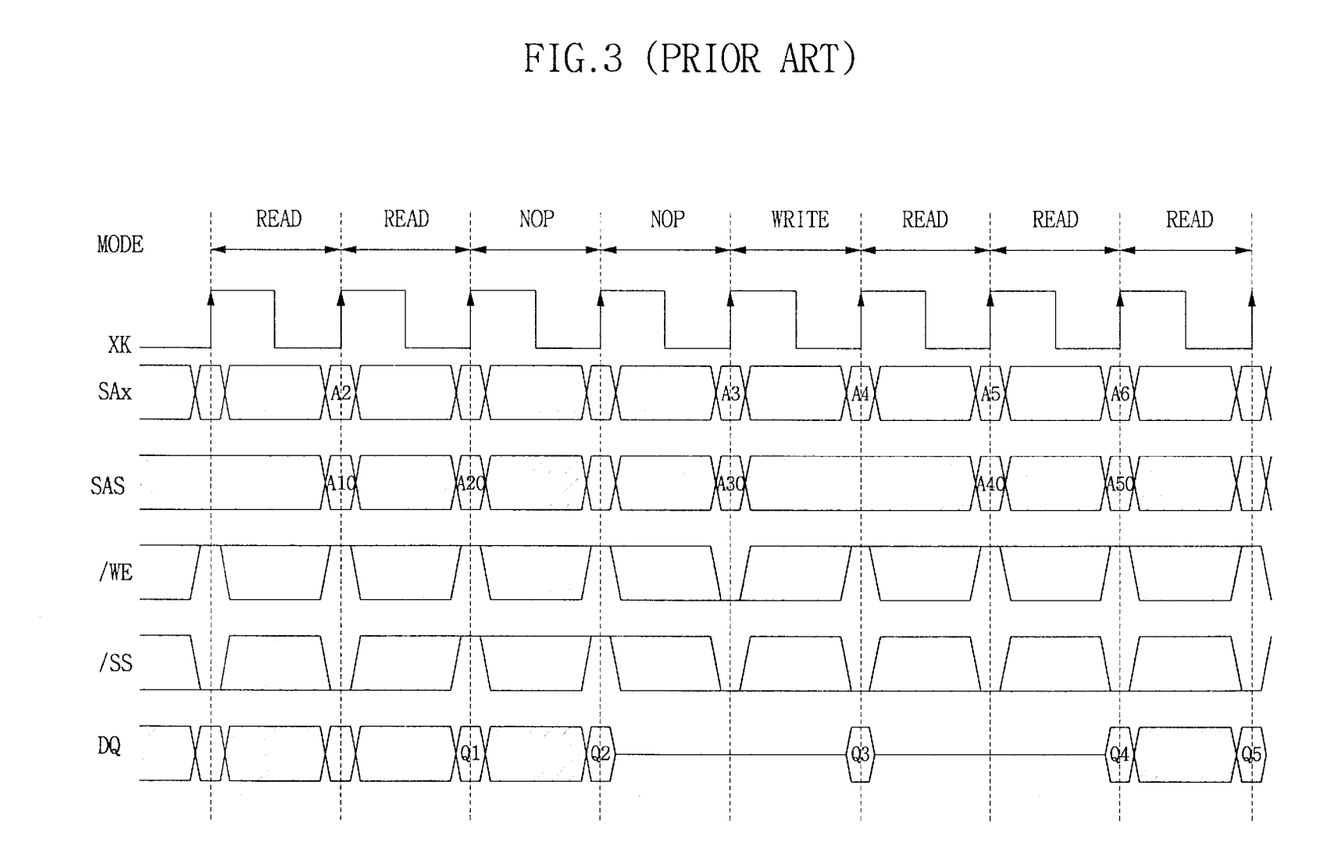
FIG. 3 is a timing diagram illustrating late write operation in the memory shown in FIG. 2.

The reason why the late selection synchronous pipeline memory devices as shown in FIG. 2 employ the scheme in which two separate memory chips are combined into a single chip is to reduce the board area in the system or the loading burden. The semiconductor memory device having the scheme as shown in FIG. 2 is designed to perform the late write operation in the timing view as shown in FIG. 3. It is desired that the data coherency maintaining method or the structure in the data coherency maintaining circuit is improved to be applicable to the late selection synchronous pipeline type memory devices.

As described, the conventional data coherency maintaining circuit is suitable for a single memory chip, but not for a semiconductor memory device of the late select synchronous pipeline type. Accordingly, a need exists for a data coherency maintaining method and system which is suitable for a semiconductor memory device having the scheme in which two or more memory banks or chips are packaged into one chip.

SUMMARY OF THE INVENTION

Accordingly, it is an object of the present invention to provide a late write type semiconductor memory device by which the aforementioned problems are solved.

It is another object of the present invention to provide a semiconductor memory device having a data coherency maintaining circuit that is appropriate for a semiconductor memory device having a scheme in which at least two memory banks or chips are packaged in a single chip.

It is still another object to provide a data coherency maintaining method and circuit which is appropriate to a late select synchronous pipeline type semiconductor memory device that is operated by a late select synchronous pipeline type input/output protocol and has at least two memory chips in which each of separate read paths is connected to a common input/output port.

It is still another object to provide a static random access memory with which data access operation is performed with various bypass operation in late select synchronous pipeline type semiconductor devices operating at high speed.

To accomplish the aforementioned and other objects, the present invention provides a method of maintaining data coherency in a semiconductor memory device that is operated according to a late select synchronous pipeline type input/output protocol and has at least two memory chip blocks each of which has a read path connected to a common input/output port. The method of maintaining data coherency includes the steps of generating first and second bypass summation signals by utilizing a chip block select address signal inputted in a latest write operation and comparison signals obtained from comparison between a latest write address and a current read address; and generating first and second bypass control signals having logic values contrary to each other by utilizing the first and second bypass summation signals and an internal clock signal, wherein a bypass operation is performed in one of read paths associated with the at least two memory chip blocks and a normal read operation is performed through other read paths when all of the comparison signals are same.

According to another aspect of the present invention, there is provided a data coherency maintaining circuit for a semiconductor memory device that is operated according to a late select synchronous pipeline type input/output protocol and has at least first and second memory chip blocks each of which has a read path connected to a common input/output port. The data coherency maintaining circuit includes a bypass summator for generating first and second bypass summation signals by utilizing a chip block select address signal and comparison signals obtained from comparison between a write address inputted in a latest write operation and a current read address; a bypass control part for generating first and second bypass control signals and first and second core control signals having logic values contrary to logic values of the first and second bypass signals, respectively, by utilizing the first and second bypass summation signals and an internal clock signal; a first switching part for shutting off a read path of the first memory chip block in response to a disable state of the first core control signal and bypassing write data stored in a data input register to a data output buffer in response to an enable state of the first bypass control signal; and a second switching part being operated contrary to an operation of the first switching part in a bypass operation such as transferring output data that is read from the second memory chip block to the data output buffer in response to an enable state of the second core control signal and preventing bypass of the write data stored in the data input register in response to a disable state of the second bypass control signal.

The present invention has advantages such that a bypass operation for maintaining data coherency is effectively performed in a semiconductor memory device having a scheme in which two or more banks or memory chips are combined into one chip.

DETAILED DESCRIPTION OF PREFERRED EMBODIMENTS

The aforementioned objects, features, and advantages of the present invention will be cleared by the following detailed and preferred embodiments of the present invention with reference to the accompanying drawings.

Figure 4:
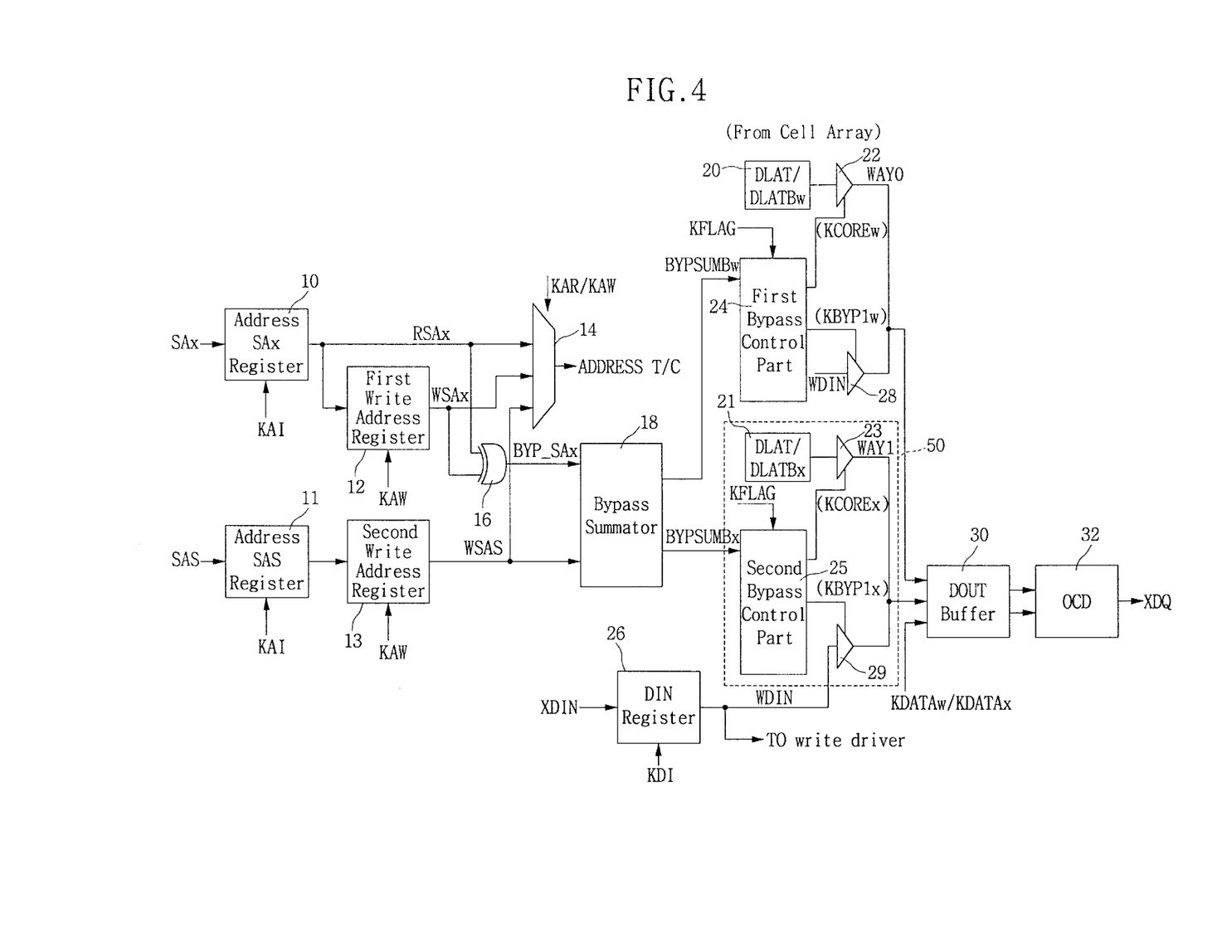
FIG. 4 is a block diagram showing a data coherency maintaining circuit in a semiconductor memory device according to an embodiment of the present invention.

FIG. 4 is a block diagram showing a data coherency maintaining circuit according to a preferred embodiment of the present invention. The data coherency maintaining circuit is applicable to a synchronous semiconductor memory device that has at least first and second memory banks in which each of read paths is connected to a common input/output port and is operated in a late select synchronous pipeline type input/output protocol, like the structure as shown in FIG. 2.

Referring to FIG. 4, the circuit structure comprises a bypass summator 18, a first bypass control part 24, a second bypass control part 25, a first switching part having a first transmission part 22 and a second transmission part 28, and a second switching part having a third transmission part and fourth transmission part.

In FIG. 4, the address SAx register 10 samples an external address SAx every cycle in response to a clock signal KAI to store the sampled data therein. The external address SAx is a normal address designating memory cells for data access. The sampled address data stored in the address register 10 is output as an input address RSAx. The input address RSAx is output as a read address signal ADDRESS T from the multiplexer 14 in response to the internal clock KAR in a read operation, and stored in a first write address register 12 in response to the internal clock KAW in a write operation. The input address stored in the first write address register 12 is output as a write address WSAx which is output as a write address signal ADDRESS C from the multiplexer 14 in response to the internal clock KAW in a next write operation.

The comparator 16 compares the input address RSAx with the write address WSAx to determine whether the write address is the same as the read address. The bypass comparison signal BYP_SAx being outputted from the comparator 16 is input to the bypass summator 18.

On the other hand, a chip block select address SAS being input as an external address to select one of the first and second memory chip blocks 2, 4 shown in FIG. 2 is input to the address SAS register 11. The address SAS register 11 samples the chip block select address SAS every cycle in response to the clock signal KAI to store the sampled address data therein. The chip block select address stored in the address SAS register 11 is output to a second write address register 13, and the second write address register 13 latches the chip block select address from the address SAS register 11 in response to the internal clock KAW to store it as a chip block select address signal WSAS. The stored chip block select address signal WSAS is output as a pulse signal in response to the internal clock KAW to the bypass summator 18 and the multiplexer 14 in the next write operation cycle. Preferably, the chip block select address SAS is input from the outside in the same timing as the normal address in a write operation and in a later timing than the normal address in a read operation, to select one of the memory chip blocks.

Accordingly, the chip block select address signal WSAS is enabled in a pulse type signal irrespective of the chip block select address SAS so that a read operation is performed for both the first and second paths WAY0, WAY1 of the first and second memory chip blocks 2, 4 (referring to FIG. 2). As shown in FIG. 4, the chip block select address signal WSAS is directly input to the bypass summator 18 without passing through the comparator 16. The reason is that since the external address SAS is input one cycle after the normal address SAx is input during a read operation, it cannot be determined whether data in memory cells should be output to an output buffer or data in an input data register should be output to the output buffer.

The bypass summator 18 receives the chip block select address signal WSAS to select the first and second memory chip blocks and comparison signals BYP_SAx obtained from the comparison between the write address WSAx inputted during the prior operation cycle and the read address RSAx inputted during the current operation cycle and generates first and second bypass summation signals BYPSUMBw, BYPSUMBx.

The first bypass control part 24 receives the first bypass summation signal BYPSUMBw and the internal clock signal KFLAG to generate a first bypass control signal KBYP1w and a first core control signal KCOREw having logic contrary to the first bypass control signal.

The second bypass control part 25 receives the second bypass summation signal BYPSUMBx and the internal clock signal KFLAG to generate a second bypass control signal KBYP1x having logic contrary to the first bypass control signal and a second core control signal KCOREx having logic contrary to the second bypass control signal.

The first switching part has the first and second transmission parts 22, 28. The first transmission part 22 transmits sense amp output data that is read, for example, from the first memory chip bank 2 (referring to FIG. 2) and stored in a first data latch unit 20 to a data output buffer 30 connected to a common input/output port XDQ at its output terminal, in response to the enabled first core control signal KCOREw. The second transmission part 28 transmits write data stored in a data input register 26 to the data output buffer 30 in response to the enabled first bypass control signal KBYP1w.

The second switching part has the third and fourth transmission parts 23, 29. The third transmission part 23 transmits sense amp output data that is read, for example, from by the second memory chip bank 4 (referring to FIG. 2) and stored in a second data latch unit 21 to the data output buffer 30 in response to the enabled first core control signal KCOREx. The fourth transmission part 29 transmits write data stored in the data input register 26 to the data output buffer 30 in response to the enabled second bypass control signal KBYP1x.

Figure 6:
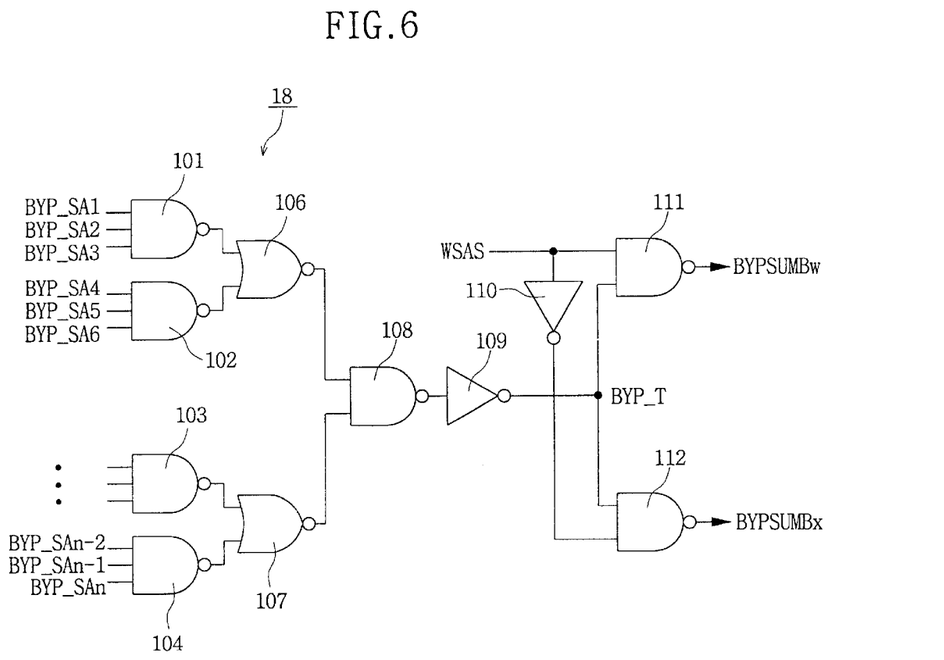
FIG. 6 is a circuit view showing a preferred embodiment of the bypass summator in FIG. 4.

FIG. 6 is a circuit diagram illustrating a preferred embodiment of the bypass summator 18 shown in FIG. 4. Referring to FIG. 6, the bypass summator 18 includes NAND gates 101, 102, 103, 104 for receiving the comparison signals BYP_SAx (here, x=1, 2, . . . , n) each generating a NAND response, NOR gates 106, 107 for receiving outputs of the NAND gates to generate a NOR response, a NAND gate 108 for receiving outputs of the NOR gates to generate a NAND response thereof, a first inverter 109 for inverting an output of the NAND gate 108, a first NAND gate 111 for receiving the chip block select address signal WSAS and the output of the first inverter 109 to output a NAND response thereof as the first bypass summation signal BYPSUMBw, a second inverter 110 for inverting the chip block select address signal WSAS, and a second NAND gate 112 for receiving the outputs of the second inverter 110 and the first inverter 109 to output a NAND response thereof as the second bypass summation signal BYPSUMBx.

Figure 7:
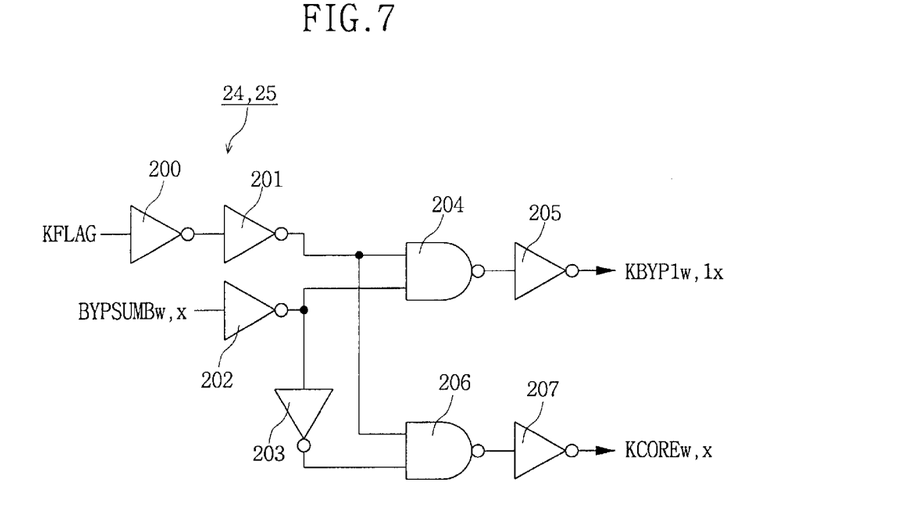
FIG. 7 is a circuit view showing a preferred embodiment of the bypass control part in FIG. 4.

FIG. 7 is a circuit diagram illustrating a preferred embodiment of one of the bypass control parts 24, 15 shown in FIG. 4. Referring to FIG. 7, the first bypass control part includes inverter members 200, 201 for delaying the internal clock signal KFLAG; an inverter 202 for inverting the bypass summation signal BYPSUMBw or BYPSUMBx; a first gating part 204, 205 for receiving the outputs of the inverter member 201 and the inverter 202 to generate a NAND response thereof and inverting the NAND response to generated an output as the bypass control signal KBYP1w or KBYP1x; and a second gating part 206, 207 for receiving the output of the inverter member 201 and the inverted output of the inverter 202 to generate a NAND response thereof and inverting the NAND response to generate an output as the core control signal KCOREw or KCOREx. The first and second bypass control parts 24, 25 in FIG. 4 have the substantially same structure as the bypass control part in FIG. 7.

Figure 5:
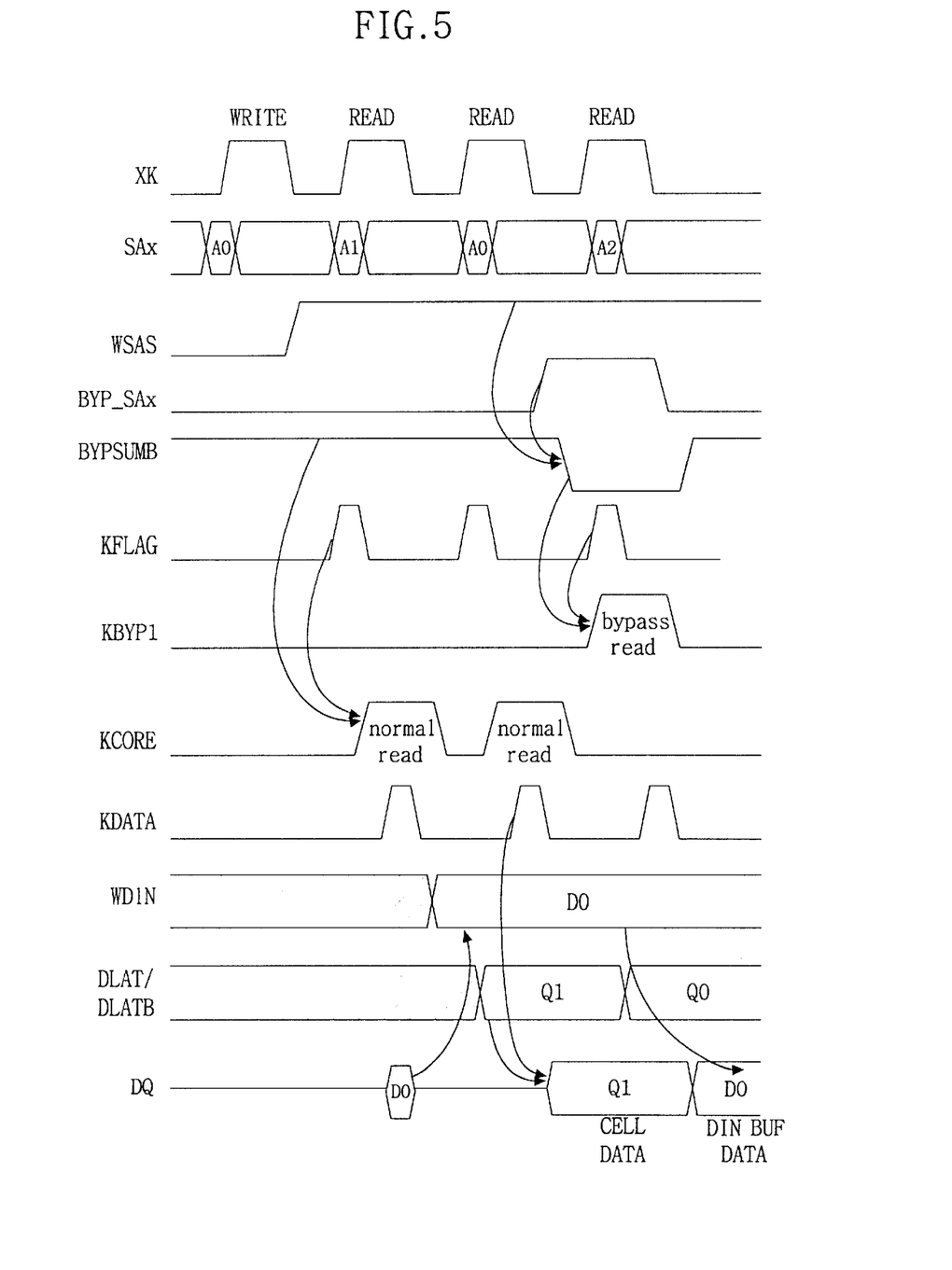
FIG. 5 is a timing diagram showing an operation in the circuit shown in FIG. 4.

FIG. 5 is a timing diagram for illustrating the operation of the data coherency maintaining circuit in FIG. 4. In FIGS. 4 and 5, the same designations represent the same signals.

The operation of the data coherency maintaining circuit in FIG. 4 will be explained in detail with reference to FIG. 5, without any intention to limit the protective scope of the invention.

The chip block select address SAS is input from the outside with the same timing as the normal address in a write operation, and input from the outside with the timing later than the normal address in a read operation. Accordingly, the read operation according to the present invention is performed in accordance with the timing shown in FIG. 5. In an operation cycle just before the external address SAS is input, data in the memory chip blocks (for example, 2 and 4 in FIG. 2) are entirely read irrespective of the external address SAS. Then, in the current cycle, one of the read paths (for example, WAY0 and WAY1 in FIG. 2) is selected as an output path according to the external address SAS. For example, as shown in FIG. 5, in case that the data read operation is performed in the address A0 at which the latest write operation was performed, the data which is stored in the data input register 26, not the data in the memory cell in the memory cell array of WAY0(2) or WAY1(4), should be output as read data. This is because the write data D0 that is input from the outside by the latest write operation is not written at a predetermined memory cell in the memory cell array, but stored in the data input register 26.

Thus, the data in the data register 26 should be bypassed and output as read data to accomplish data coherency. In order to do so, first, the comparator 16 compares the write address WSAx that is input during the latest write operation with the read address RSAx that is input during the current cycle to determine whether the write address and the read address are identical to each other. FIG. 4 shows only one comparator, but the number of the comparators may vary with the number of the address bits.

The comparison signals BYP_SAx that are outputted from the plurality of comparators are input to the NAND gate members 101, 102, 103, 104 in the bypass summator 18 as shown in FIG. 6. When the address inputted in the write operation and the address inputted in the read operation are same, all the comparison signals BYP_SAx have a same logic level. For example, when all the comparison signals BYP_SAx have a logic level "H", all the outputs of the NAND gate members become a logic level "L", thereby all the outputs of the NOR gate members 106, 107 become a logic level "H".

Accordingly, the output of the NAND gate 108 becomes a logic level "L" and the output of the inverter 109 becomes a logic level "H". In this regard, when the chip block select address signal WSAS is at a logic level "H", the output of the NAND gate 111 in FIG. 6 is at a logic level "L", thereby the first bypass summation signal BYPSUMBw is enabled, which is indicated as a wave form BYPSUMB shown in FIG. 5. Meanwhile, the second bypass summation signal BYPSUMBx being generated in the NAND gate 112 becomes a logic level "H". By receiving the first bypass summation signal BYPSUMBw, the first bypass control part 24 in FIG. 4 controls the first and second transmission part 22, 28 so that the bypass read operation is performed with respect to the first memory chip block (2) or the first data path WAY0. By receiving the second bypass summation signal BYPSUMBx, the second bypass control part 25 controls the third and fourth transmission parts 23, 29 so that the normal read operation is performed with respect to the second memory chip block (4) or the second data path WAY1.

As a result, in case that all the comparison signals BYP_SAx are enabled at a same logic level, one of the read paths WAY0(2), WAY1(4) performs a bypass operation in response to the signal WSAS, and the other read path performs a normal read operation by which data from the memory cells in the corresponding bank are read. If the comparison signals BYP_SAx are not output as a same level, first and second bypass summation signals YPSUMBw, BYPSUMBx become a logic level "H", so that a normal read operation is performed with respect to the data paths WAY0(2) and WAY1(4).

In case that all the comparison signals BYP_SAx have a same logic level, the first and second bypass summation signals BYPSUMBw, BYPSUMBx are input to the first and second bypass control parts 24, 25 in FIG. 7 as logic levels "L" and "H", respectively. The first bypass control part 24 logically combines the first bypass summation signal BYPSUMBw of level "L" and the internal clock signal KFLAG having a high pulse in the wave form KFLAG shown in FIG. 5 to output the first bypass control signal KBYP1w having logic level "H" and the first core control signal KCOREw having logic level "L". Accordingly, the first transmission part 22 shown in FIG. 4 is disabled and the second transmission part 28 is enabled, thereby the write data stored in the data input register 26 is transmitted to the data output buffer 30. As a result of performing the bypass operation, the data D0 in the wave form DQ shown in FIG. 5 is output as bypass data.

On the other hand, the second bypass control part 25 logically combines the second bypass summation signal BYPSUMBx of level "H" and the internal clock signal KFLAG having a high pulse in the wave form KFLAG shown in FIG. 5 to output the second bypass control signal KBYP1x having logic level "L" and the second core control signal KCOREx having logic level "H". Accordingly, the fourth transmission part 29 shown in FIG. 4 is disabled and the third transmission part 22 is enabled thereby data read through the path WAY1(4) is transmitted to the data output buffer 30. The signal DLAT/DLATBx(21) in FIG. 4 indicates the output data of the sense amplifier detecting and amplifying the memory cell data in the memory cell array.

Data applied to the data output buffer 30 from the two paths is transferred to an off chip divider OCD 32 under control of buffer control signals KDATAw, KDATAx obtained from external address SAS. As a result, data in a selected path is output through the data output terminal XDQ.

As described in the foregoing, with the bypass summator and the plurality of the bypass control parts for determining whether the bypass operation is performed, the select switching part having the first and second switching parts are controlled, thereby data coherency can be maintained in a semiconductor memory device having a scheme in which two or more banks or memory chips are combined into one chip.

Even though the aforementioned bypass summator, bypass control parts and operations thereof were described with reference to FIGS. 6 and 7, such description is only an example. Accordingly, various modifications can be made within the limitation that does not go beyond the scope of the present invention. For example, the logic gates can be replaced with other equivalent circuit devices or other logic devices. According to the present invention as described in the foregoing, there are advantages such that a bypass operation for maintaining data coherency is effectively performed in a semiconductor memory device having a scheme in which two or more banks or memory chips are combined into one chip.

What is claimed is:

1. A method for maintaining data coherency in a semiconductor memory device that is operated according to a late select synchronous pipeline type input/output protocol and has at least two memory chip blocks each of which has a read path connected to a common input/output port, comprising the steps of:

generating first and second bypass summation signals by utilizing a chip block select address signal inputted in a latest write operation and comparison signals obtained from comparison between a latest write address and a current read address; and generating first and second bypass control signals having logic values contrary to each other by utilizing the first and second bypass summation signals and an internal clock signal, wherein a bypass operation is performed in one of read paths associated with the at least two memory chip blocks and a normal read operation is performed through other read paths when all of the comparison signals are same.

2. The method as defined in claim 1, wherein the first and second bypass summation signals are obtained by performing a logic operation with respect to the chip block select address signal inputted in the latest write operation and the comparison signals resulting from comparing the latest write address with the current read address.

3. The method as defined in claim 1, wherein the first bypass control signal is obtained by performing a logic operation with respect to the first bypass summation signal and the internal clock signal to convert read operation in a read path of one of the memory chip blocks to a bypass operation, and the second bypass control signal is obtained by performing a logic operation with respect to the second bypass summation signal and the internal clock signal to convert read operation in a read path of another one of the memory chip blocks to a bypass operation.

4. The method as defined in claim 1, wherein the chip block select address signal to select the memory chip blocks is input from outside in a same timing as a normal address in a write operation, and input from outside in a timing later than the normal address in a read operation.

5. A data read method in a semiconductor memory which has at least two memory chip blocks each of which has a read path connected to a common input/output port and is operated in a late select synchronous pipeline type input/output protocol, comprising the steps of:

generating first and second bypass summation signals by utilizing a chip block select address signal inputted in a latest write operation and comparison signals obtained from comparison between a latest write address and a current read address; and generating first and second bypass control signals having logic values contrary to each other by utilizing the first and second bypass summation signals and an internal clock signal, wherein a normal read operation for the at least two memory chip blocks is independently performed from one another through read paths associated with the respective memory chip blocks when any of the comparison signals are different from each other.

6. The method as defined in claim 5, wherein the first and second bypass summation signals are obtained by performing a logic operation with respect to the chip block select address signal inputted in the latest write operation and the comparison signals resulting from comparing the latest write address with the current read address.

7. The method as defined in claim 5, wherein the first bypass control signal is obtained by performing a logic operation with respect to the first bypass summation signal and the internal clock signal to convert read operation in a read path of one of the memory chip blocks to a bypass operation, and the second bypass control signal is obtained by performing a logic operation with respect to the second bypass summation signal and the internal clock signal to convert read operation in a read path of another one of the memory chip blocks to a bypass operation.

8. The method as defined in claim 5, wherein the chip block select address signal to select the memory chip blocks is input from outside in a same timing as a normal address in a write operation, and input from outside in a timing later than a normal address in a read operation.

9. A data coherency maintaining circuit of a semiconductor memory device being operated according to a late select synchronous pipeline type input/output protocol and having at least first and second memory chip block each of which has a read path connected to a common input/output port, comprising:

a bypass summator for generating first and second bypass summation signals by utilizing a chip block select address signal and comparison signals obtained from comparison between a write address inputted in a latest write operation and a current read address;

a bypass control part for generating first and second bypass control signals and first and second core control signals having logic values contrary to logic values of the first and second bypass signals respectively, by utilizing the first and second bypass summation signals and an internal clock signal;

a first switching part for shutting off a read path of the first memory chip block in response to a disable state of the first core control signal and bypassing write data stored in a data input register to a data output buffer in response to an enable state of the first bypass control signal; and a second switching part being operated contrary to an operation of the first switching part in a bypass operation, the second switching part transferring output data that is read from the second memory chip block to the data output buffer in response to an enable state of the second core control signal and preventing bypass of the write data stored in the data input register in response to a disable state of the second bypass control signal.

10. The circuit as defined in claim 9, wherein the bypass summator comprising:

NAND gates for receiving the comparison signals, each of the NAND gates generating a NAND response of input signals;

NOR gates for receiving outputs of the NAND gates, each of the NOR gates generating a NOR response of input signals;

a NAND gate for receiving outputs of the NOR gates to generate a NAND response;

a first inverter for inverting output of the NAND gate;

a first NAND gate for performing NAND operation with respect to the chip block select address signal and an output of the first inverter to output the first bypass summation signal;

a second inverter for inverting the chip block select address signal; and a second NAND gate for performing NAND operation with respect to outputs of the second inverter and the first inverter to output the second bypass summation signal.

11. The circuit as defined in claim 9, wherein the bypass control part comprises first and second bypass control parts for receiving the first and second bypass summation signals, respectively, and having a substantially same structure, wherein the first bypass control part comprises:

an inverter member for delaying the internal clock signal;

an inverter for inverting the first bypass summation signal;

a first gating part for performing NAND operation with respect to outputs of the inverter member and the inverter to generate a first NAND response and inverting the first NAND response to generate the first bypass control signal; and a second gating part for performing NAND operation with respect to an output of the inverter member and an inverted output of the inverter to generate a second NAND response and inverting the second NAND response to generate the first core control signal.

12. A data coherency maintaining circuit of a synchronous semiconductor memory device having at least first and second memory chip blocks each of which has a read path connected to a common input/output port, comprising:

a bypass summator for generating first and second bypass summation signals by utilizing a chip block select address signal for selecting the at least first and second memory chip blocks and comparison signals resulting from the comparison between a write address inputted in a prior operation and a read address input in a current operation, wherein the first and second bypass summation signals have logic values contrary to each other when a bypass operation is performed;

a first bypass control part for generating a first bypass control signal and a first core control signal having a logic value opposite to the first bypass signal by utilizing the first bypass summation signal and an internal clock signal;

a second bypass control part for generating a second bypass control signal having a logic value opposite to the first bypass control signal and a second core control signal having a logic value opposite to the second bypass signal by utilizing the second bypass summation signal and the internal clock signal;

a first switching part having a first transmission part for transferring sense amp output data which is read from the first memory chip block to a data output buffer connected to the common input output port in response to an enable state of the first core control signal and a second transmission part for transferring a write data stored in a data input register to the data output buffer in response to an enable state of the first bypass control signal; and a second switching part having a third transmission part for transferring sense amp output data which is read from the second memory chip block to the data output buffer in response to an enable state of the second core control signal and a fourth transmission part for transferring a write data stored in the data input register to the data output buffer in response to an enable state of the second bypass control signal.

13. The circuit as defined in claim 12, wherein the bypass summator comprises:

NAND gates for receiving the comparison signals, each of the NAND gates generating a NAND response of input signals;

NOR gates for receiving outputs of the NAND gates, each of the NOR gates generating a NOR responses of input signals;

a NAND gate for receiving outputs of the NOR gates to generate a NAND response;

a first inverter for inverting output of the NAND gate;

a first NAND gate for performing NAND operating with respect to the chip block select address signal and an output of the first inverter to output the first bypass summation signal;

a second inverter for inverting the chip block select address signal; and a second NAND gate for performing NAND operation with respect to outputs of the second inverter and the first inverter to output the second bypass summation signal.

14. The circuit as defined in claim 12, wherein the first bypass control part comprises:

an inverter member for delaying the internal clock signal;

an inverter for inverting the first bypass summation signal;

a first gating part for receiving outputs of the inverter member and the inverter to generate a first NAND response and inverting the first NAND responses to generate the first bypass control signal; and a second gating part for receiving an output of the inverter member and an inverted output of the inverter to generate a second NAND response and inverting the second NAND response to generate the first core control signal.

15. The circuit as defined in claim 12, wherein the second bypass control part comprises:

an inverter member for delaying the internal clock signal;

an inverter for inverting the second bypass summation signal;

a first gating part for receiving outputs of the inverter member and the inverter to generate a first NAND response and inverting the first NAND response to generate the second bypass control signal; and a second gating part for receiving an output of the inverter member and an inverted output of the inverter to generate a second NAND response and inverting the second NAND response to generate the second core control signal.

16. The circuit, as defined in claim 12, wherein each of the first, second, third, and fourth transmission parts includes CMOS transmission gates.

17. A data coherency maintaining circuit of a late write synchronous pipe line type semiconductor memory in which at least first and second cache memory chip blocks having respective read paths connected to a common input/output port are combined into one chip, comprising:

a bypass determining part for determining whether a bypass operation is performed in response to a result of combination of an internal clock signal and a bypass summation signal obtained by utilizing a chip block select address signal and comparison signals resulting from comparison between an inputted write address and a currently inputted read address; and a select switching part for transferring in a read operation a write data stored in a data input register to a data output buffer connected to the common input/output port when the bypass operation is required in one of the first and second cache memory chip blocks, and transferring in the read operation a data that is read from the cache memory chip blocks to the data output buffer when the bypass operation is not required.

* * * * *